Figure 1:
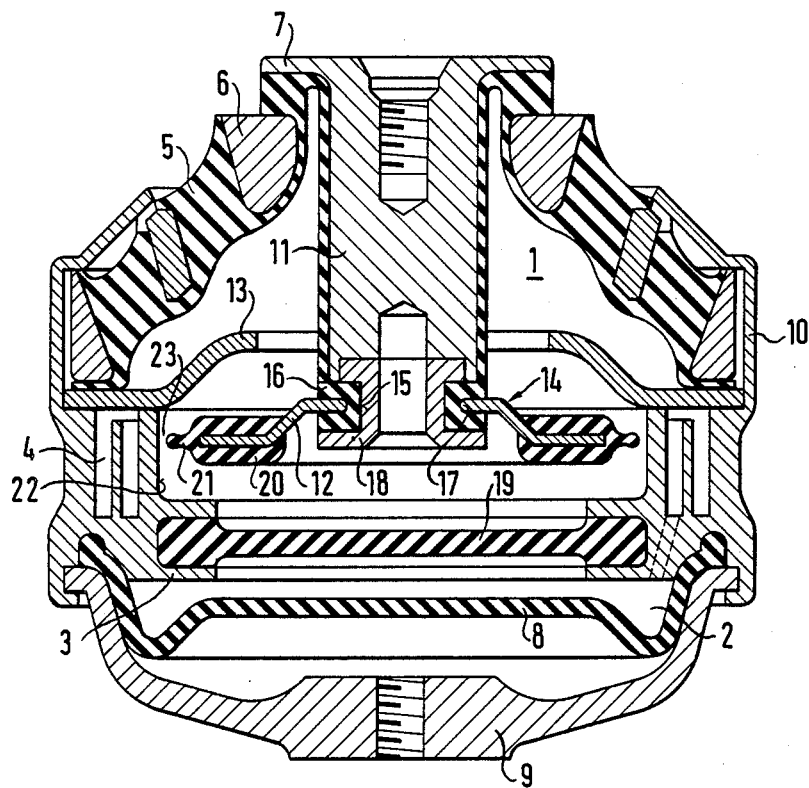

United States Patent [19]

Kaiser et al.

[11] Patent Number: 4,921,049
[45] Date of Patent: May 1, 1990

[54] HYDRAULIC-DAMPING TWO-CHAMBER ENGINE MOUNT

[75] Inventors: Franz-Josef Kaiser, Bannberscheid; Wolfgang Sauer, Ransbach, both of Fed. Rep. of Germany

[73] Assignee: Metzeler GmbH, Munich, Fed. Rep. of Germany

[21] Appl. No.: 325,208

[22] Filed: Mar. 16, 1989

[30] Foreign Application Priority Data

Mar. 17, 1988 [DE] Fed. Rep. of Germany ....... 3808996

[51] Int. Cl.⁵ .............................................. F16F 5/00
[52] U.S. Cl. ................................. 267/140.1; 267/219
[58] Field of Search ......... 248/562; 267/219, 140.1 R, 267/140.1 A

[56] References Cited

U.S. PATENT DOCUMENTS

| 2,380,899 | 7/1945 | Strachovsky | 267/140.1 R |
| 4,607,828 | 8/1986 | Bodin et al. | 267/140.1 R |
| 4,757,982 | 7/1988 | Andrä et al. | 267/140.1 A |
| 4,770,396 | 9/1988 | Jouade | 267/140.1 A |

Primary Examiner—Duane A. Reger
Attorney, Agent, or Firm—Herbert L. Lerner; Laurence A. Greenberg

[57] ABSTRACT

A hydraulic-damping two-chamber engine mount includes a working chamber and a compensating chamber. A conical jacket-like elastomeric wall has an end surface and a bearing plate is disposed on the end surface and borders the working chamber along with the elastomeric wall. The bearing plate has a cylindrical attachment with an end protruding into the working chamber. A rigid intermediate plate has an overflow conduit formed therein providing communication between the chambers. An integrated tension stop in the form of an annular stop plate has an inner edge suspended with play on the end of the cylindrical attachment for damping axial and radial mobility of the stop plate. A substantially conical jacket-like stop ring is provided for engaging the stop plate from above.

4 Claims, 1 Drawing Sheet

U.S. Patent    May 1, 1990    4,921,049

HYDRAULIC-DAMPING TWO-CHAMBER ENGINE MOUNT

The invention relates to a hydraulic-damping two-chamber engine mount, including a working chamber defined by a conical jacket-like or shell-shaped elastomeric wall and a bearing plate on an end surface of the elastomeric wall, the working chamber communicating with a compensating chamber through an overflow conduit in a rigid intermediate plate, and an integrated tension stop in the form of an annular stop plate protruding from the inner end surface of the bearing plate into the working chamber, the top of the stop plate being engaged from behind by a substantially conical jacket-like or shell-shaped stop ring.

German Published, Non-Prosecuted Application No. DE-OS 34 43 619 discloses an engine mount of abovementioned kind. In the integrated tension and compression stop provided therein, the stop plate is rigidly joined to the bearing plate, so that despite the provision of a rubber overlay on the stop plate, deflection is followed by a relatively hard impact on the stop ring or on the intermediate plate, and this can cause undesirable noise.

It is accordingly an object of the invention to provide a hydraulic-damping two-chamber engine mount, which overcomes the hereinafore-mentioned disadvantages of the heretofore-known devices of this general type, which has an integrated tension and compression stop in which a gentle, quiet impact is assured, and additionally in which the dynamic rigidity of the mount can be reduced through a limited frequency range, by means of a special embodiment.

With the foregoing and other objects in view there is provided, in accordance with the invention, a hydraulic- damping two-chamber engine mount, comprising a working chamber, a conical jacket-like elastomeric wall having an end surface, a bearing plate disposed on the end surface and bordering the working chamber along with the elastomeric wall, the bearing plate having a cylindrical attachment with an end protruding into the working chamber, a compensating chamber, a rigid intermediate plate having an overflow conduit formed therein providing communication between the chambers, an integrated tension stop in the form of an annular stop plate having an inner edge suspended with play on the end of the cylindrical attachment for damping axial and radial mobility of the stop plate, and a substantially conical jacket-like stop ring for engaging the top of the stop plate from above or behind.

Through the use of this damped suspension of the stop plate with a play, clearance or backlash, on one hand greater axial and radial free play of the stop plate is obtained and on the other hand a soft impact upon arrival of the stop plate on an opposing surface is assured.

The damping of the mobility can be attained if in accordance with another feature of the invention, the stop plate is rubber-elastically suspended with play.

In accordance with a further feature of the invention, there is provided a rubber-elastic sheathing being disposed on the inner edge of the stop plate and being disposed in a groove encompassing the inner end of the cylindrical attachment providing play.

In order to attain damping, in accordance with an added feature of the invention, there is provided a rubber-elastic diaphragm connected between the stop plate and the cylindrical attachment, the rubber-elastic diaphragm defining a free space sealed off from the surroundings and filled with a highly viscous fluid providing play.

In accordance with an additional feature of the invention, the stop plate has upper and lower surfaces, and the cylindrical attachment has a groove formed therein encompassing the end of the cylindrical attachment and defining edges of the end of the cylindrical attachment above and below the groove, the inner edge of the stop plate being disposed in the groove with axial and radial play, and including separate annular rubber-elastic diaphragms sealingly disposed between the edge above the groove and the upper surface of the stop plate as well as between the edge below the groove and the lower surface of the stop plate, the diaphragms enclosing a space filled with a highly viscous fluid providing play.

In accordance with a concomitant feature of the invention, there are provided inner walls surrounding the stop plate, a rubber overlay sheathing disposed on the outer periphery of the stop plate, the rubber overlay sheathing having a rubber lip protruding radially and defining a free gap of given width between the rubber lip and the inner walls. This produces a directed gap flow of hydraulic fluid, which provides additional insulation of acoustical vibrations Other features which are considered as characteristic for the invention are set forth in the appended claims.

Although the invention is illustrated and described herein as embodied in a hydraulic-damping two-chamber engine mount, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
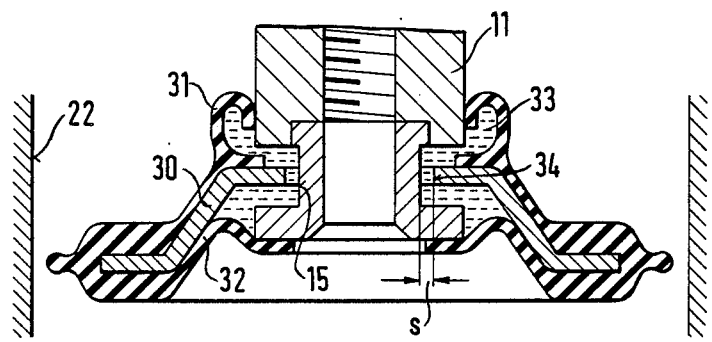

FIG. 1 is a diagrammatic, longitudinal-sectional view of a two-chamber engine mount having an integrated tension and compression stop with a rubber-elastically suspended stop plate: and FIG. 2 is a fragmentary longitudinal-sectional view of a mount having a stop plate that is damped by highly viscous fluid.

Referring now to the figures of the drawing in detail and first, particularly, to FIG. 1 thereof, there is seen an engine mount having a working chamber 1 and a compensating chamber 2, which communicate with one another through an annular conduit 4 disposed in an intermediate plate 3. A rubber-elastic diaphragm 19 for decoupling high-frequency vibrations is also fastened centrally in the intermediate plate 3. The working chamber 1 is enclosed by a substantially conical, jacket-like or shell-shaped peripheral wall 5, which acts as a support spring, is made of rubber-elastic material, and is closed off at the end surface thereof by a bearing ring 6 and a thrust element with adjustable radial rigidity. The thrust element is constructed in the form of a bearing or retaining plate 7 and is vulcanized onto the top of the peripheral wall 5.

The compensating chamber 2 is defined by an elastic bellows 8 and is closed off from the outside by a lower housing cap 9. which simultaneously serves as a mounting point. The individual parts which substantially form the engine mount, namely the conical, jacket-like or shell-shaped chamber 5, the intermediate plate 3 having the conduit 4, the bellows 8 and the housing cap 9, are joined together and braced against one another in a sealing manner by an outer ring 10, which is part of the intermediate plate 3.

The engine mount also has an integrated tension and compression stop, which is in the form of an annular stop plate 12 from the inner end of a cylindrical attachment 11 of the bearing plate 7 which protrudes into the working chamber 1. The top of the stop plate 12 may be engaged from behind by a substantially conical, jacket-like or shell-shaped stop ring 13.

According to the invention, the inner edge of the stop plate 12 is rubber-elastically suspended in a damped manner with play, clearance, recoil or backlash 14. To this end, the inner edge of the attachment 11 has an encompassing groove 15, into which the inner edge 17 of the stop plate 12 is inserted while sheathed with rubber-elastic material 16. Suitably, the stop plate 12 and the rubber sheathing 16 forming the play 14 are vulcanized in a mold and then inserted into the attachment 11 by means of a separate ring 18.

The rubber-elastic suspension of the stop plate 12 provides a continuous transition in the spring characteristic of the mount, from the softer spring rigidity of the support spring 5 to the hard spring rigidity which occurs upon contact of the stop plate 12 with either the intermediate plate 3 or the stop ring 13, so that when shocks occur the transmission of noise is reduced.

The rubber-elastic suspension moreover enables gimbal motions of the stop plate 12 to occur relative to the bearing plate 7, whenever the support spring 5 is deflected by radial or axial forces. This rubber-elastic suspension allows longer axial and radial travel for the same installation space, in comparison with a rigidly fastened stop plate.

The rubber-elastically suspended stop plate 12 also acts as a counter-oscillating mass upon oscillating excitation of the metal bearing plate 7, and in the quenching or cancellation action thereof reduces the dynamic rigidity of the mount in a limited frequency range.

According to a further feature of the invention, the outer periphery of the stop plate 12 is conventionally sheathed with a rubber overlay 20 and has a radially protruding rubber lip 21 at the outer periphery thereof. The lip has a width which is adjusted in such a way that a narrow gap 23 of predetermined width remains free between the lip and an opposed inner wall 22. The flow in this gap 23 that is induced upon a vibrational excitation of the metal bearing plate 7 precedes the fluid flow in the overflow conduit 4, and thus effects a reduction in the dynamic rigidity of the mount, which is provided for the sake of better insulation in the frequency range of the acoustical vibrations. Through the use of suitable adaptation of the geometry of the gap, the minimum in dynamic rigidity can be adjusted as a function of the frequency.

A possible variation of the damping suspension of the bearing plate is shown in the exemplary embodiment of FIG. 2. In FIG. 2, only the lower end of the cylindrical attachment 11 and the disposition of a stop plate 30 are shown on a larger scale.

The stop plate 30 is placed with axial and radial play in the groove 15 which functions to provide clearance or play. The top or lower surface of the stop plate 30 is connected in a fluid-tight manner to the edge of the lower portion of the attachment 11 above the groove 15 by an annular diaphragm 31 and the bottom or lower surface of the stop plate is connected to the region or edge below the groove 15 by an annular diaphragm 32. A free space 33 thus formed is filled with a highly viscous fluid.

On one hand, the result is a long, free, axial travel of the stop plate 30 within the clearance or play in the tension and compression direction, which occurs in a way that is virtually impossible with a vulcanized-in stop. On the other hand, due to the greater mobility of the stop plate, the insulation from structure-borne sound is also greater.

The spring characteristic when the stop plate rests on the stops can be varied by varying the gap width s between an inner opening 34 of the stop plate 30 and an inner wall of the groove 15, since the highly viscous fluid must flow through the gap with losses, which result in damping of the motion.

With the above-described suspension of the stop plate with clearance or play and damping of the motions in the axial and radial direction, a longer free travel of the stop, and a gentler impact with less noise and moreover with a reduction in the dynamic rigidity of the mount, due to the action of the relatively freely movable stop plate acting as an additional quenching or cancellation mass, are accordingly possible. The foregoing is a description corresponding in substance to German Application P 38 08 996.3, dated Mar. 17, 1988, the International priority of which is being claimed for the instant application, and which is hereby made part of this application. Any material discrepancies between the foregoing specification and the aforementioned corresponding German application are to be resolved in favor of the latter.

We claim:

1. Hydraulic-damping two-chamber engine mount, comprising a working chamber, a support spring with a relatively soft spring constant in the form of a conical jacket-like elastomeric wall having an end surface, a bearing plate disposed on said end surface and bordering said working chamber along with said elastomeric wall, said bearing plate having a cylindrical attachment with an end having a groove formed therein defining groove walls, a compensating chamber, a rigid intermediate plate having an overflow conduit formed therein providing communication between said chambers, an integrated tension stop in the form of an annular stop plate projecting into said working chamber and having an inner edge suspended in said groove formed in said end of said cylindrical attachment defining an axial and radial free space between said inner edge and said groove walls and permitting increased play in axial and radial directions and gimbal motion of said stop plate, a substantially conical jacket-like stop ring, axial mobility of said stop plate being limited upwardly by said stop ring and downwardly by said intermediate plate, and damping medium filling said free space and providing a continuous transition from said relatively soft spring constant of said support spring to a relatively hard spring constant during abutment of said stop plate against said stop ring and said intermediate plate.

2. Engine mount according to claim 1, including a rubber-elastic sheathing being disposed on said inner edge of said stop plate and being disposed in said groove.

3. Engine mount according to claim 1, wherein said stop plate has upper and lower surfaces, and said groove walls include upper and lower edges above and below said groove, and including separate annular rubber-elastic diaphragms sealingly disposed between said edge above said groove and said upper surface of said stop plate as well as between said edge below said groove and said lower surface of said stop plate, said diaphragms enclosing a space filled with a highly viscous fluid providing play.

4. Engine mount according to claim 1, including inner walls surrounding said stop plate, a rubber overlay sheathing disposed on the outer periphery of said stop plate, said rubber overlay sheathing having a rubber lip protruding radially and defining a free gap of given width between said rubber lip and said inner walls.

* * * * *